March 27, 1951 C. NIBAUD 2,546,865
GEAR SHIFTING DEVICE
Filed Dec. 28, 1948 6 Sheets-Sheet 1
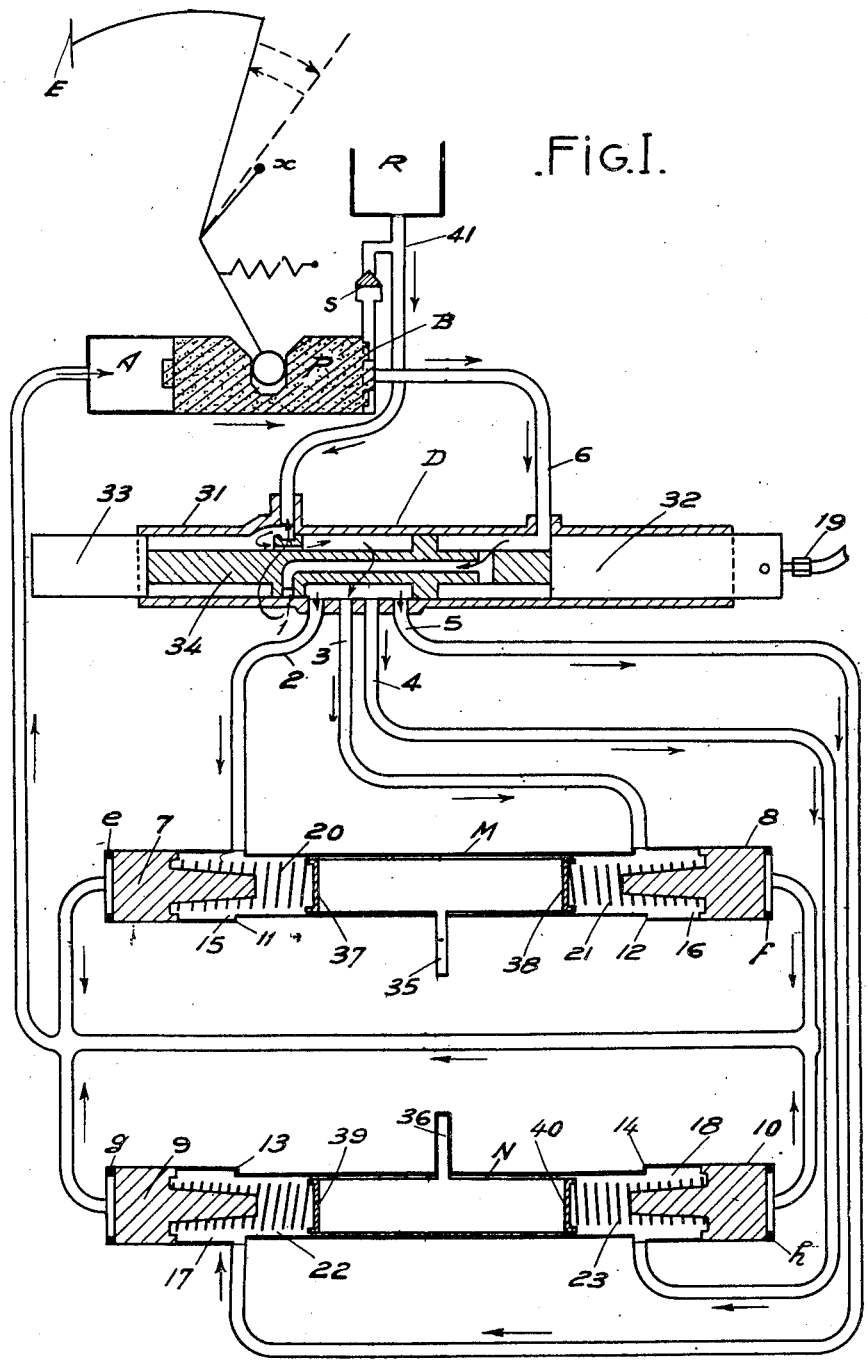
Fig.I.
INVENTOR
CHARLES NIBAUD
By his attorneys
Howson and Howson

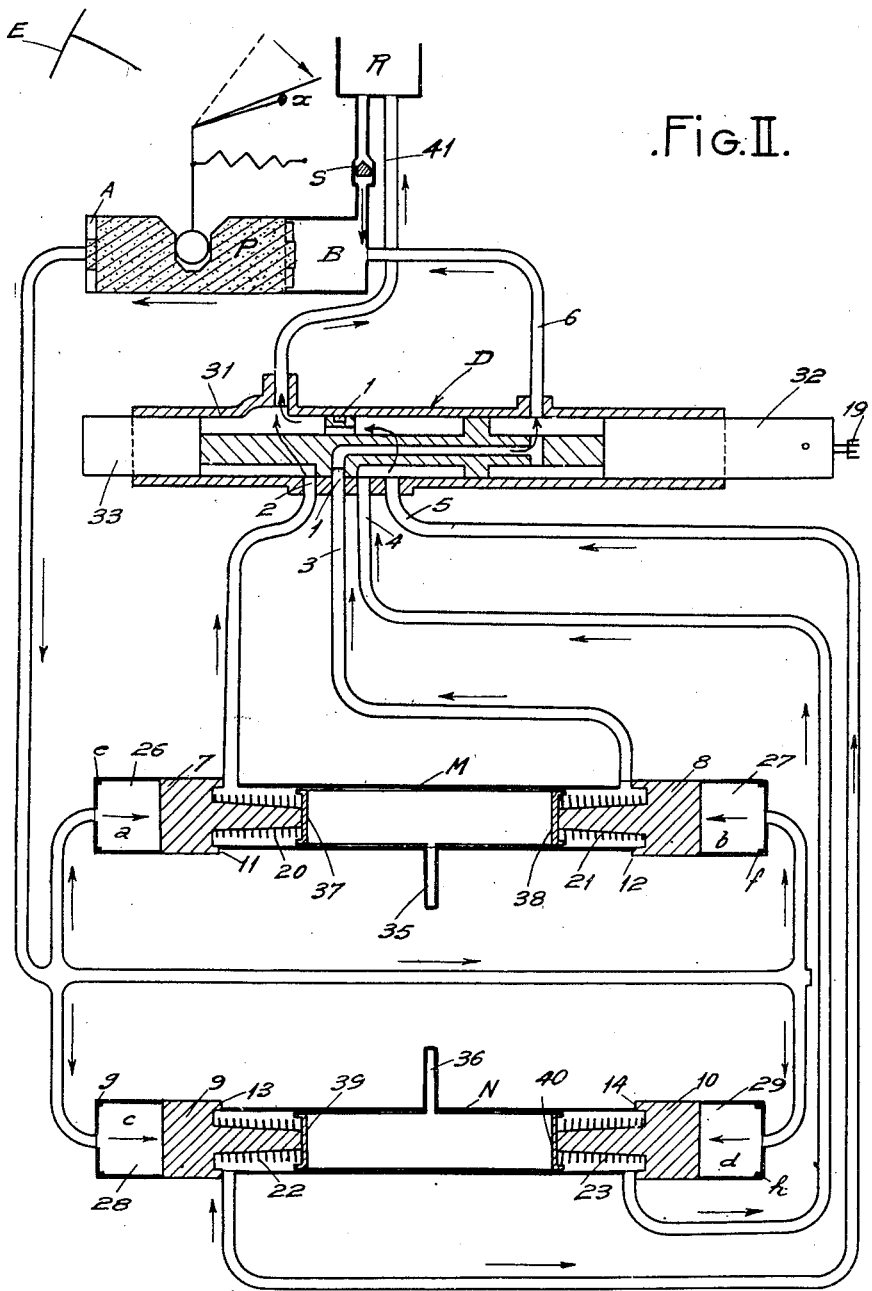

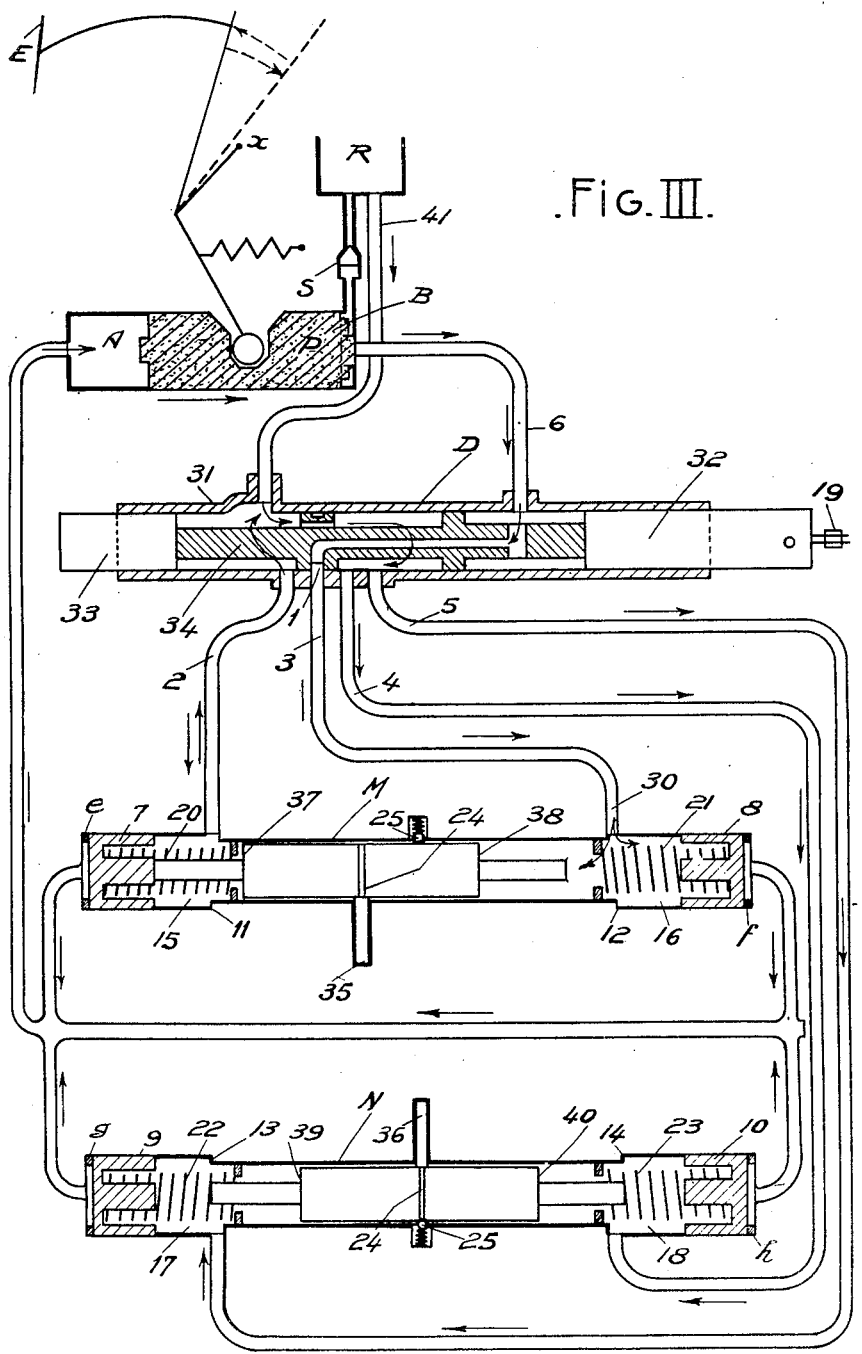

March 27, 1951 C. NIBAUD 2,546,865
GEAR SHIFTING DEVICE
Filed Dec. 28, 1948 6 Sheets-Sheet 4
Fig. IV.
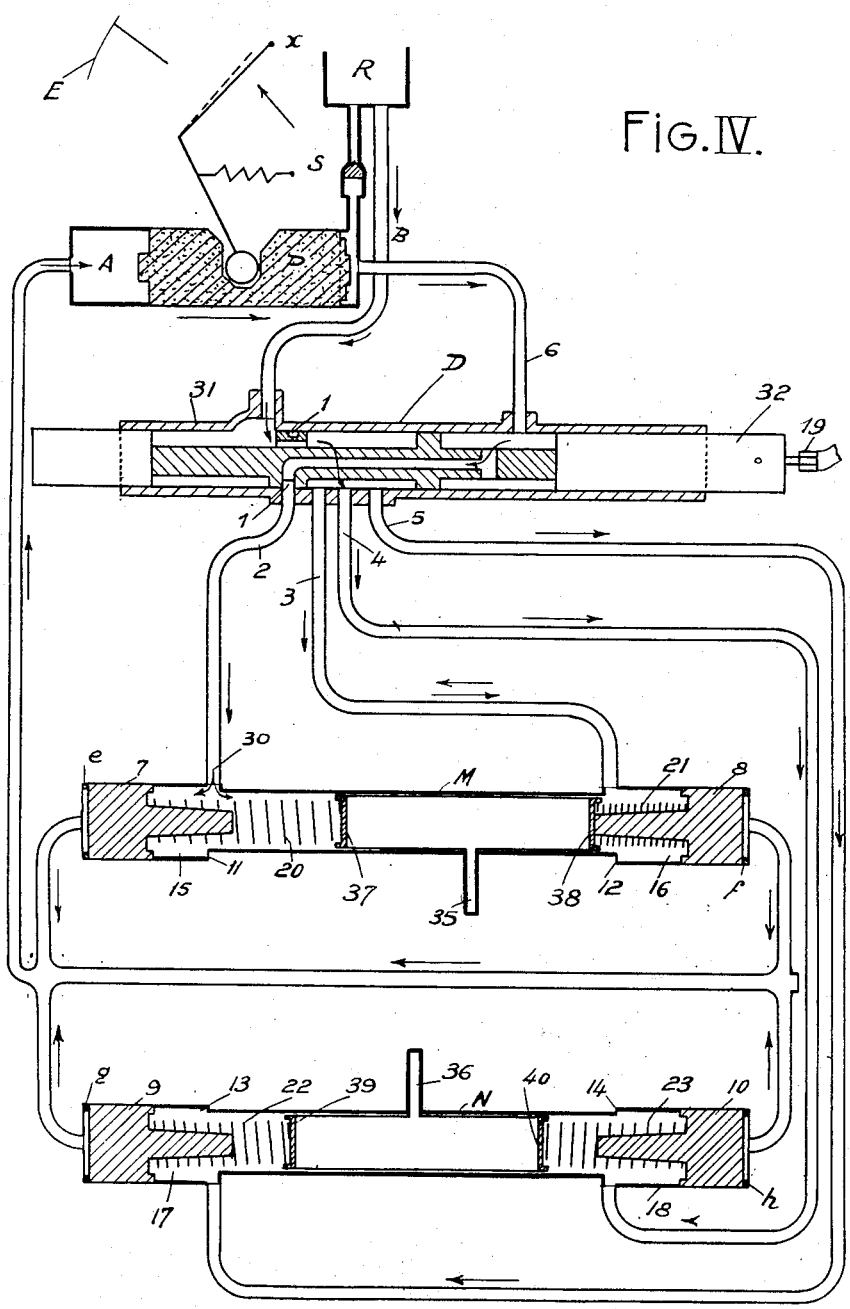
INVENTOR
CHARLES NIBAUD
By his attorneys
Howson and Howson March 27, 1951 — C. NIBAUD — 2,546,865
GEAR SHIFTING DEVICE
Filed Dec. 28, 1948 — 6 Sheets-Sheet 5
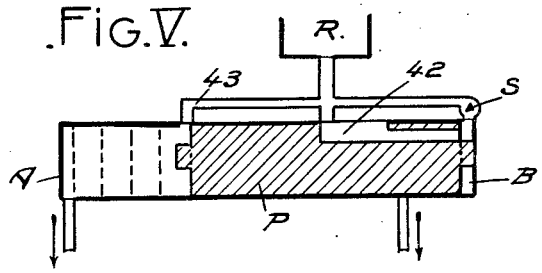
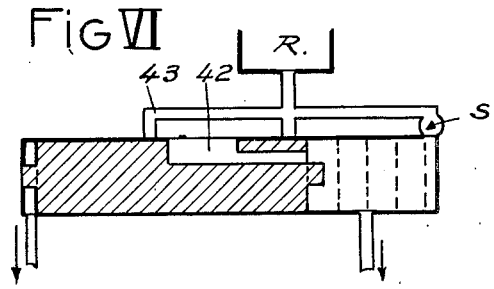
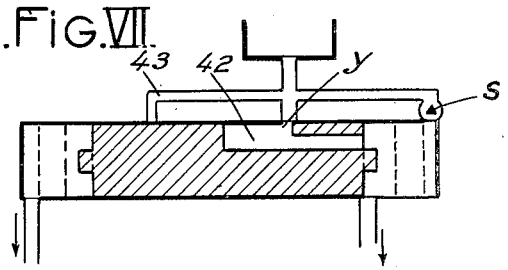
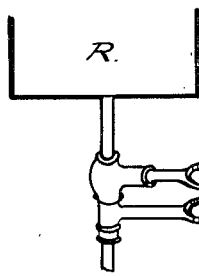
INVENTOR
CHARLES NIBAUD
By his attorneys
Howson and Howson

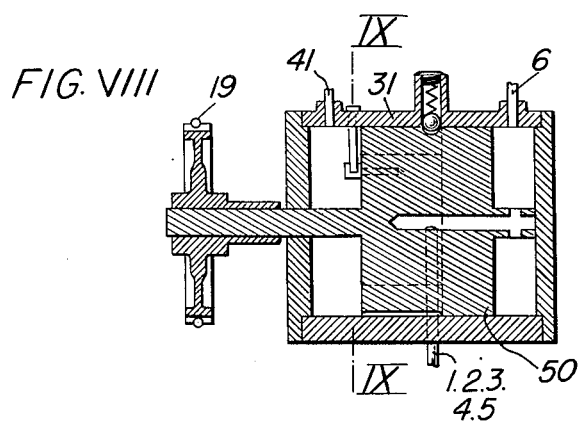
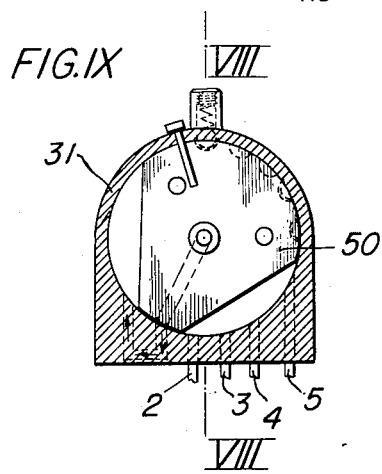
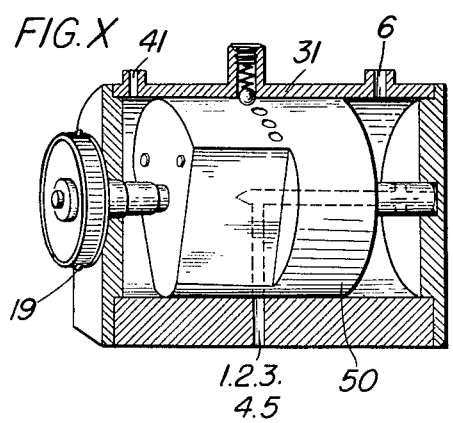

Patented Mar. 27, 1951

2,546,865

UNITED STATES PATENT OFFICE 2,546,865

GEAR SHIFTING DEVICE

Charles Nibaud, Neuilly-sur-Seine, France

Application December 28, 1948, Serial No. 67,655
In France January 14, 1948

14 Claims. (Cl. 74—334)

The present invention relates to a speed- or gear-shifting device and is particularly though not exclusively applicable to automotive vehicles.

In shift gears in an automobile it is generally necessary to actuate a hand-lever which has to be operated substantially simultaneously with the clutch-control foot-lever or pedal. Thus, in nearly all types of automobile, a gear-shifting operation requires substantially synchronous manual and foot action to be performed.

It is a general object of my invention to provide a device adapted greatly to simplify the operations which have to be performed on shifting speeds.

Another and more specific object is to provide a pre-selective gear-shifting device wherein a pre-selector system is operative to condition the change-speed device proper for operation, and the gear-shift may thereafter be effected simply through acting on the clutch pedal of the motor.

Another object is to provide such a gear-shifting device which is readily applicable for the operation of change-speed mechanisms remotely disposed from the control station without requiring the provision of a special transmission linkage or the like and without obliging the driver to supply increased stress in applying the control.

It is a further and related object to provide such a device which is especially applicable for use in connection with vehicles of the type wherein the engine and the speed-box are both located at the rear of the vehicle.

According to another object pursued by the invention, the means provided for selecting the required gear ratio are adapted to be actuated through a lever or a flexible control means such as a control of the Bowden cable type. Said last-mentioned control means may be operated from a hand-lever arranged under the steering-wheel or on the dash-board of the car or at any other point which may be found suitable or convenient. Actuation of said lever or flexible control means only requires exertion of low stress, as its function merely consists of imparting movement to a distributor or selector member formed with position-setting catches or the like, which member is not subjected to any substantial degree of pressure.

Aside from the very simple mechanical control means just mentioned, the remainder of the control transmission mechanism in the gear-shift device of the invention merely comprises a system of hydraulic circuit connections.

A further and accessory object of the invention is to provide, in conjunction with a gear-shift device of the kind set forth, a very simple and highly effective anti-theft appliance.

Other objects and advantages of the invention, together with the characteristic features thereof, will appear as the specification proceeds.

The invention will now be described in detail in a preferred form of embodiment thereof given by way of illustration and not of limitation, reference being had to the accompanying drawings, of which:

Figs. I to IV inclusive show the hydraulic control device and the pre-selector system at various stages of the operation thereof.

Figs. V to VII illustrate a double-acting drive pump in various stages of its operation.

Figs. VIII, IX and X are, respectively, a view in axial section on the line VIII—VIII of Fig. IX; a view in cross-section on the line IX—IX of Fig. VIII; and a diagrammatic isometric view, of an alternative construction of the distributor unit, in which the unit is rotary.

And Fig. XI shows a theft-prevention device adapted for use in connection with the control mechanism of the invention.

As shown, the device essentially comprises:

(1) A double-acting pump A—B directly controlled from the clutch-pedal E and supplied with pressure fluid from an externally arranged tank or supply R.

Said pump comprises a single piston member P. In the form of embodiment shown in Figs. V to VII, the piston P is formed with a blow-off or relief conduct 42. This relief conduct allows on the one hand the necessary volume of fluid to circulate operatively on one side of the pump, and on the other hand, it enables any excess fluid to drain back towards the tank R. In this way, the respective bodies of fluid set into motion by both pumps, while remaining equal in volume, are caused at all times to differ from each other as to their effective actions. There is further provided in this embodiment a pressure-balancing and filling conduct 43 adapted to prevent any tendency of the volume A to expand.

Moreover, whatever type of pump is used, a check-valve S is inserted in the connection from the tank R to the pump-chamber B.

(2) A hydraulic distributor D adapted to have its operative position controlled through manual actuation of a control transmission provided with position-selecting catches. Said transmission may simply comprise a Bowden cable 19. The distributor unit D may be provided of the rotary or the slidable type as desired. In Figs. I to IV, inclusive, the distributor unit has been shown as of the slidable type, while one feasible design for a rotary type distributor has been separately shown for illustrative purposes in Figs. VIII, IX and X.

As shown in Figs. I to IV, the distributor unit comprises a cylinder 31 in which is slidably mounted a core or valve member comprising a pair of slide-blocks 32 and 33 interconnected through a part 34 formed with ducts, ports, and shoulders or lands as clearly shown in Figs. I, II, III, IV. Said ducts and ports are adapted to be uncovered through operation of the control transmission such as the Bowden cable 19.

A rotary type of distributor is illustrated in Figs. VIII, IX and X, according to an alternative of the invention. In these figures, elements having similar or corresponding functions to elements of the slidable distributor unit of Figs. I to IV have been designated by similar references. It will be seen that the rotary distributor unit generally comprises a cylindrical casing 31 in which a cylindrical valve or core member 50 is mounted for rotation, suitable ducts and ports being formed in the casing and the core to provide the appropriate selective operation of the unit, to be described hereinafter, on selective rotation of the core member 50 by rotary control means 19, of any suitable type, operable by the driver of the vehicle.

It should be understood that, while the description of the operation of the device according to the invention, as disclosed hereinafter, will refer more specifically to the slidable type of distributor illustrated in Figs. I to IV, the same description will apply mutatis mutandis to the rotary distributor unit of Figs. VIII to X.

The position imparted to the distributor core or valve member is adapted to determine and set the shifting to the desired gear.

(3) A pair of double-acting fluid motors M and N. Both fluid motors are constructed on identical lines.

The fluid motor M comprises two pistons 37—38 rigidly connected with each other and with a fork 35. The fluid motor further includes two side pistons 7 and 8 arranged one on each side of the pump barrel. A spring 20 is provided to act between the piston 7 and the piston 37 and a spring 21 similarly acts between piston 8 and piston 38.

The pump N also comprises two pistons 39—40 rigid with a fork 36 and two side pistons 9 and 10 with the interposal of springs 22 and 23.

The forks 35 and 36 when actuated are adapted to shift the speed-box actuating pinion to its desired position. The part interconnecting the pistons 37—38 (and the part interconnecting pistons 39—40) may be retained in position (see Fig. III) by means of a ball 25 subjected to the action of a spring and projecting into a groove or slot 24 formed in the said part. Packing seals may be provided on the pistons 37—38—39—40. Said pistons may, according to particular requirements, be formed as shown in Figs. I, II, IV or on the other hand as shown in Fig. III. The same is true of pistons 7—8—9—10.

Resiliently deformable spring washers *e*, *f*, *g*, and *h* may be provided in order to prevent any tendency of the volumes 15—16—17 and 18 to expand. The function of the side pistons 7—8—9—10 is, at each actuation of the pedal, to move in order to restore the clutch-control forks 35 and 36 to their neutral position.

Each fluid motor M—N may be arranged to control one or two speeds. In other words, there may be a fluid motor for reverse and a first forward speed with a neutral position, a second fluid motor for one or two additional speeds, and a third pump for a fifth and a sixth speed when provided. The embodiment shown and the ensuing description relate to a device with four speeds and a neutral.

The two units formed by the pump A—B on the one hand and the fluid motors M—N on the other, may be arranged one above the other and directly mounted over the change-speed gear box. The said units together include practically all of the hydraulic circuit connections of the mechanism, so that in the case of a vehicle having a forwardly-arranged motor, there will only have to be a conduct for connection with the tank R provided externally of said units. Where the motor is arranged at the rear of the vehicle, since the tank R is also arranged rearwardly and the mechanical connection from the clutch to the pump A—B will likewise be at the rear, the general disposition will be the same as before, and only the Bowden cable will have to be suitably lengthened.

Air blow-off plugs, of the screw-type for instance, may be provided to allow filling the device with the oil necessary for proper operation thereof, both on assembly and in the event of a breakdown. For ordinary maintenance purposes, the level of oil in the tank R should be kept within suitable predetermined limits.

In the example shown, the distributor or selector is adapted to assume five independent settings or positions, viz.:

Neutral—reverse—a first speed—a second—and a third speed.

It will be understood however that the above-indicated settings are in no way restrictive, and more or less speeds may be provided as the case may be.

The above-described device operates as follows:

*Neutral, Figs. I and II*

1. The foot-pedal E is pushed forward.

The distributor being at neutral (Fig. I), forward movement of the pedal (Fig. II) is operative at the same time as it produces the conventional declutching operation, to cause the following effects:

(a) The oil contained in cylinder A is expelled and the pistons 7—8—9—10 are moved up against the respective stops 11—12—13—14.

(b) Movement of the pistons 7—8—9—10 results in restoring the pistons 37—38 and 39—40 to neutral position, if they were not already in that position, and said pistons are yieldingly locked in that position under the slight pressure of the ball 25 in its groove 24 (Fig. III).

(c) Oil is expelled from the spaces 15—16—17—18 (Fig. I) and that oil returns through conducts 2—3—4—5 and distributor D to tank R.

(d) The pump chamber B is filled (Fig. III), either by drawing oil in from the tank R, with the check-valve S open, or by drawing a fraction of the oil from spaces 15—16—17—18 through the distributor.

2. Return stroke of the pedal E (Fig. I).

(a) The check-valve S is closed, the oil is expelled from the cylinder B through the conduct 6 into the distributor, but since the latter is by-passed, the drive fluid returns back to the tank through a circumferential groove 1 (Fig. I) which in this position is uncovered, and this is effected without any action on the pistons 37—38 and 39—40, and the check-valve S remaining closed.

(b) The cylinder A is filled with oil drawn from spaces a—b—c—d (Fig. II). The pistons 7—8—9—10, under the combined effects of the springs 20—21—22—23 and a certain amount of suction, are returned to their initial position.

Under the combined action of suction and gravity, the spaces 15—16—17—18 retrieve through the conducts 2—3—4—5 the oil previously expelled therefrom in the prior displacement of said pistons. This oil is supplied both by the cylinder B and the contribution of the tank R, the conduct 41 being in communication with the conducts 2—3—4—5.

*First speed, Figs. II and III*

(1) Forward movement of the pedal E, Fig. II.

The distributor is shifted to "first speed" setting. After a conventional automatic declutching operation, the stroke of the piston P expels the oil contained in pump A. The latter then urges the pistons 7—8—9—10 which engage pistons 37—38 and 39—40, and the forks 35—36 are then restored to neutral (assuming the forks were previously in gear on any speed).

The oil which filled the spaces 15—16—17—18 (Fig. III) returns through conducts 2—4—5 and the distributor (see Fig. II) to the tank R. The oil in space 16 is discharged therefrom and, through distributor D and conducts 3 and 6 (Figs. II and III) sucked into cylinder B. As the capacity of the cylinder B is greater than the space 16, filling of space 16 proceeds with the necessary supplementary oil being drawn in from the tank R. The valve S is then open. Actually, the effective flow capacity of the pump B is equal to the capacity of one of the spaces 15—16—17—18 (Fig. III) plus the displacement of the pistons 37—38 or 39—40 in one or the other direction, namely, the combination of the above-mentioned two volumes as indicated in Figs. III and IV by the reference 30 and which is the same for all four gears.

(2) Return stroke of the pedal (Fig. III).

The pump A is filled and restores the pistons 7—8—9—10 to their starting position. Moreover the valve S being closed, the pump B is operative through the distributor and the conduct 3 to discharge all of its oil supply into the space 16. Since the effective capacity of B is equal to the volume 30 (Figs. III and IV) as just described above, the oil actuates the piston 37—38 until the latter engages piston 7. The excess oil in space 15 returns through the distributor to the tank R. The gear-shifting operation is then completed.

*Shifting from first to reverse (Figs. II and IV)*

The distributor is brought to its "reverse" position. Such operation is effected without acting on the pedal and in no way affects the pistons 37—38 and 39—40 since there is no operative pressure prevailing in the apparatus. The desired gear is merely "pre-selected."

If the pedal E is pushed on its forward stroke (Figs. II and IV), the following operations occur:

(1) After preliminary throwing out of the clutch, the oil contained in pump A is discharged therefrom, and acts on the pistons 7—8—9—10, restoring all of those pistons into engagement against the stops 11—12—13—14. During this deplacement, the piston 7 pushes the piston 37—38 out of its first gear position into neutral position. The oil contained in the spaces 16—17—18 is discharged through conducts 3—4—5 and the distributor into the tank R.

(2) The piston 37—38 first being in first gear position, the oil in space 15 (Fig. III) is displaced together with said piston, but remains within the cylinder M. The volume of cylinder B is filled with the oil from the double volume 16 actually equivalent to volume 30 and with make-up oil from the tank R, the check-valve S being opened for the inflow of the requisite additional amount of oil.

*Return stroke of the pedal (Fig. IV)*

Operations are similar to those previously described in connection with first gear.

(1) The pump A is filled with oil from spaces a—b—c—d and the pistons 7—8—9—10 return to their starting position.

(2) The valve S being closed, B discharges all of its effective oil supply into 15 and urges M into engagement with piston 8. During this movement, the excess oil in space 16 will either contribute to the filling of spaces 17 and 18, or will return through conduct 3 and the distributor into the tank R.

Displacement of piston 37—38 and the fork, as caused by the filling of volume 30 (Fig. IV) brings about the desired gear-shifting. The pedal E disengages the stop X and the clutch becomes operative.

The above operation may thus be repeated for shifting to any preliminarily pre-selected gear, the selection being operable at any time as desired by the driver.

The advantages secured through the use of the above-described gear-shifting device mainly include the following:

It is possible for the driver whenever the occasion may arise and due to the possibility of effecting a preliminary pre-selection, to achieve an automatic and effortless shift to the desired gear, merely as a result of a foot-actuation of the clutch pedal.

As a result of suppressing the necessity of providing a hand-lever usually located on the center axis of the car, the device of the invention makes greater comfort available for the driver and front-seat passenger.

The small amounts of oil brought into action in the operation of the device make it possible to achieve rates of displacements as fast as in the case of hydraulic brakes such as brakes of the Lockheed type.

The device is adaptable on the vast majority of existing speed-change boxes without requiring special gears to be machined or provision of intricate transmission linkages. To adapt the device on an existing speed-box it is simply necessary to replace the cover of the box with another cover to which the whole of the device is attached.

The cost of installation, all other things remaining equal, is comparatively low, when considering the great efficiency and simplicity in operation achieved.

One aspect of the invention provides, in combination with the above-described gear-shifting apparatus, a theft-prevention device now to be described.

The theft-prevention device according to the invention comprises (Fig. VIII), inserted in the pipe connection from the tank R to the pump A—B, a screw-plug 45 having a ring-shaped head as shown, and a projecting arm 46 also terminating as a ring adjacent to the ring-shaped head of the screw 45. By screwing home the plug 45 and securing it as with a padlock or the like to the arm 46, it is possible to block the car on any suitable gear, such as reverse for instance. Since the flow of pressure fluid is no longer capable of taking place under the pressure of the clutch pedal, it is impossible for the car to be started or taken in tow otherwise than in reverse gear. It will thus be seen that the device described constitutes a simple and effective theft-prevention appliance.

It will of course be understood that the present invention is in no way limited to the forms of embodiment and constructional details described and/or illustrated, and that many modifications and variations may be conceived within the scope of the ensuing claims. Also, the invention is applicable to apparatus other than automotive vehicles, such as machine-tools, lifting apparatus and many other type of apparatus which may or may not require remote control.

I claim:

1. In a drive transmission including a clutch with a clutch control and change-speed gearing with a plurality of speeds therein and gear-control means for selectively rendering each of said speeds operative, in combination: a pressure-fluid supply, a drive pump with two pump chambers and a double-acting piston therein, means whereby said clutch control upon actuation thereof drives said piston in a first direction on the forward stroke of said clutch control and in the other direction on the return stroke thereof, servo-motor cylinders with pistons therein operating said gear-control means, hydraulic connections from the first one of said drive pump chambers to the opposite ends of each of said servo-motor cylinders thus causing said servo-motor pistons to be returned to neutral position on the forward stroke of said clutch control, a pre-settable distributor unit, hydraulic connections from said supply and from said second drive pump chamber to said distributor unit, and separate connections from said distributor unit to each side of each of said servo-motor pistons and settable valve means in said distributor unit providing communication, according to the selected setting thereof, from said second drive pump chamber to only that one of said separate connections which leads to a requisite side of a requisite servo-motor cylinder, whereby hydraulic fluid expelled from said second drive pump chamber on the return stroke of said clutch control will be operative to move the selected servo-motor pump and the related gear-control means operated thereby to the selected speed setting.

2. Combination as in claim 1 wherein said double-acting drive piston has a blow-off duct formed in the side thereof acting in said second drive pump chamber adapted to communicate with said supply throughout a portion of its stroke in said chamber to return a predetermined fraction of pressure fluid from said second chamber to said supply.

3. Combination as in claim 1 wherein said distributor unit comprises a rotary-valve assembly.

4. Combination as in claim 1 wherein said distributor unit comprises a slide-valve assembly.

5. Combination as in claim 4 wherein said distributor unit comprises a cylindrical sleeve and a valve structure slidable in said sleeve, and including a pair of slide-blocks slidably engaging the inner wall of said sleeve, a ported member rigidly interconnecting said slide-blocks adapted to register with cooperating ports in said sleeve, and a control transmission for selectively moving said member to a required one of its registering positions.

6. Combination as in claim 1 which further comprises by-pass duct means providing direct communication from said second pump chamber through said distributor unit to said supply when said distributor member is in its central setting.

7. Combination as in claim 1 wherein each of said servo-motor cylinders includes two chambers with a double-acting servo-motor piston slidable therein and adapted to operate a related gear-control means.

8. Combination as in claim 1 wherein each of said servo-motor cylinders includes two chambers, a central double-acting servo-motor piston slidable in said cylinder between said chambers and adapted to operate a related gear-selecting means, a pair of end-pistons slidable in said cylinder one on each side of said double-acting piston, and compression springs acting between each of said end-pistons and the related end of said central piston, said end-pistons being adapted, under the action of pressure-fluid simultaneously against the outer ends thereof, to restore said central piston to its neutral position.

9. In a drive transmission in a vehicle including a clutch with a clutch pedal and a change-speed gearing with a plurality of speeds therein and gear-selecting forks for selectively rendering said speeds operative, in combination: a pressure fluid supply, a drive pump with two pump chambers and a double-acting piston therein, means whereby said pedal, upon actuation thereof, drives said piston in a first direction on the forward stroke of said pedal and in the other direction on the return stroke thereof, servo-motor cylinders with pistons therein operating said selector forks, connections from the first one of said drive pump chambers to the opposite ends of said servo-motor cylinders to cause said servo-motor pistons to be returned to a neutral position on the forward stroke of said pedal, a pre-settable distributor unit, connections from said supply and from said second drive pump chamber to said distributor unit and separate connections from said unit to each side of each of said servo-motor pistons, settable valve means in said unit providing communication, according to the selected setting thereof, from said second drive pump chamber to only that one of said separate connections which leads to a requisite side of a requisite servo-motor cylinder, and a control transmission for said settable valve member operable by the driver to pre-set the distributor unit.

10. Combination as in claim 9 wherein said control transmission for pre-setting the distributor comprises a flexible cable control.

11. In a drive transmission including a clutch with a clutch pedal and a change speed gearing with a plurality of speeds therein and gear-selector members therefor, in combination: a pressure fluid supply, a drive pump with two pump chambers and a double-acting piston slidable therein, means whereby said pedal, upon actuation thereof, drives said piston in a first direction on the forward stroke and in the other direction on the return stroke of said pedal, servo-motor cylinders, in each servo-motor cylinder a central servo-motor piston operating a related one of said gear-selector members slidable in an intermediate section of said servo-cylinder and a pair of end-pistons slidable in the end-sections of said servo-cylinder, and defining a pair of inner chambers with the ends of said central piston and a pair of outer chambers with the end-walls of said servo-cylinder, a pair of compression springs urging said end-pistons outwardly of said cylinder, hydraulic connections from said first drive pump chamber to the outer chambers of all of said servo-cylinders and from said supply to said second drive pump chamber, a check-valve interposed in said last-mentioned connection adapted to seal said connection under fluid pressure exerted from said chamber towards said supply, a settable distributor unit, said unit comprising a ported valve casing and a movable ported valve member in sealing engagement therewith, a port in said casing communicating with said supply and another with said second drive pump chamber, and other ports in said casing communicating with said inner chambers of said respective servo-motor cylinders, the ports in said valve member cooperating with said casing ports to admit pressure fluid into a selected one of said inner chambers of a selected one of said servo-motor cylinders according to the setting of said valve members, and control means for setting said valve member.

12. Combination as in claim 11, wherein said valve-member includes a by-pass duct operative for a neutral setting of said member to allow said pressure-fluid to flow directly from said second drive pump chamber through said distributor unit back to said supply.

13. Combination as in claim 11, wherein a blow-off duct is formed in said drive pump piston in the side thereof acting in said second drive pump chamber, adapted to connect said chamber with said supply on the return stroke of said piston.

14. Combination as in claim 11, wherein each of said central servo-motor pistons is provided with spring-urged lock means adapted to yieldingly lock said piston in the neutral position thereof.

CHARLES NIBAUD.

REFERENCES CITED

The following references are of record in the file of this patent:

UNITED STATES PATENTS

| Number | Name | Date |
|---|---|---|
| 1,280,770 | Lauresen | Oct. 8, 1918 |
| 1,950,860 | Nathan | Mar. 13, 1934 |
| 2,012,398 | McKenzie | Aug. 27, 1935 |
| 2,035,328 | McCollum | Mar. 24, 1936 |
| 2,079,654 | Linsley | May 11, 1937 |

FOREIGN PATENTS

| Number | Country | Date |
|---|---|---|
| 476,820 | Great Britain | Dec. 16, 1937 |
| 884,887 | France | Apr. 30, 1943 |